Aug. 22, 1967     G. O. WALTER ETAL     3,336,690
HOLDING DEVICE
Filed Sept. 10, 1965
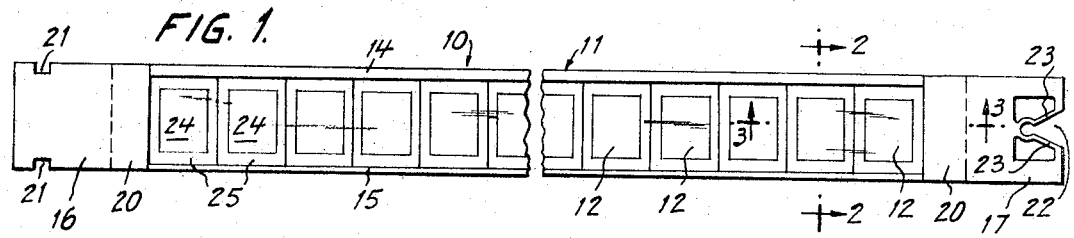
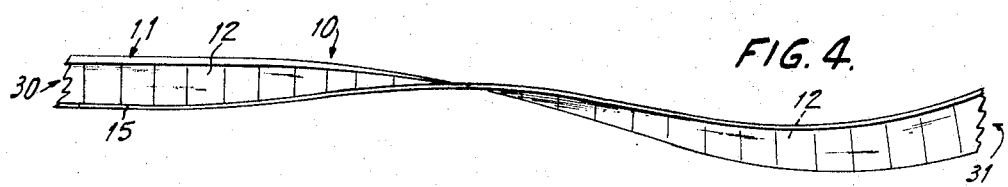
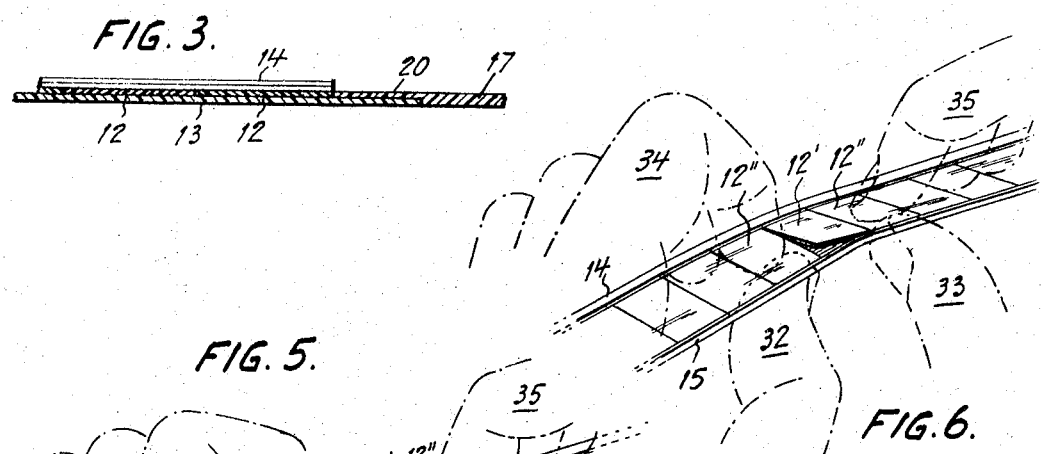
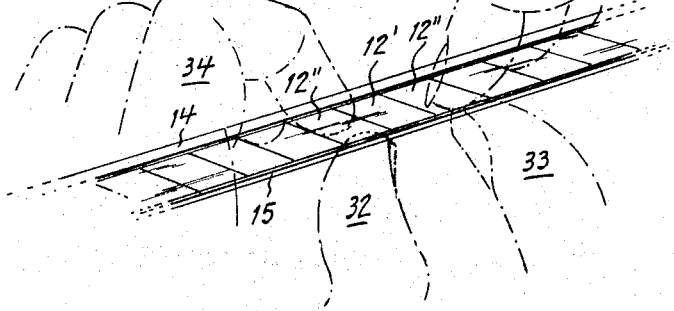
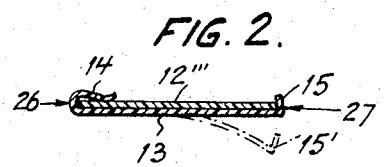
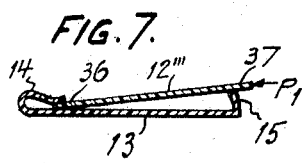
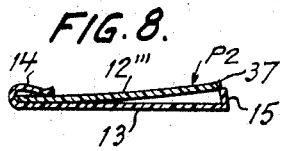
INVENTORS.
GERARD O. WALTER
FRED M. PINTUS
BY FRANK L. VAN ROTEN
ATTORNEY

United States Patent Office 3,336,690
Patented Aug. 22, 1967

3,336,690
HOLDING DEVICE
Gerard O. Walter, Westbury, Fred M. Pintus, White Plains, and Frank L. Van Roten, Richmond Hill, N.Y., assignors to Sperry Rand Corporation, New York, N.Y., a corporation of Delaware
Filed Sept. 10, 1965, Ser. No. 487,105
5 Claims. (Cl. 40—158)

ABSTRACT OF THE DISCLOSURE

A flexible transparent device for firmly holding a plurality of microfilm chips, or the like in side-by-side relationship for convenient handling in the manner of a rigid strip. The improved device is provided with characteristics which enable selective removal of any one of the plurality of chips without disturbing the next adjacent chips. Further, the device permits the insertion of a new chip, reinsertion of the removed chips at a new location and/or a general reorientation of the entire strip of chips.

---

The present invention relates in general to a holding device and more particularly to a device for holding a plurality of document replicas of the microfilm type.

In present information storage and retrieval systems it is common practice to record a particular image on a segment of microfilm and then store such image bearing segment in a coded storage complex with a plurality of similar segments bearing other recorded images. When a segment comprises a single frame of microfilm, rather than several, it is commonly referred to as a chip of microfilm. Usually, microfilm segments, whether of the chip type or otherwise, carry the image of one or more documents and, therefore, segments are referred to hereinafter for the sake of example as document replicas. In many instances, it becomes necessary to repeatedly retrieve (automatically or manually) selected document replicas for viewing the document images via a microfilm reader, for replacing a particular replica with an updated version of the document image, for reorienting the physical order of the replicas, and/or for permanently removing a particular replica from the system when the document image carried thereby has no further archival value. Regardless of the system employed, when the document replicas are repeatedly handled for the mentioned purposes or others, there is a certain amount of wear and tear that eventually results in permanent damage to the film in the form of surface marring which obscures or obliterates the image thereon. To protect the document replicas and thus avoid such marring some present systems utilize small apertured cards on which the replicas are directly mounted adjacent the aperture for viewing therethrough, or on which the replicas are mounted in transparent pockets. These cards are usually coded or have some type of identifying indicia, and therefore when the replica is changed it is also necessary to change or replace the card. In those cases where the replica is permanently mounted on the card, the card necessarily must be replaced when the replica is changed.

Other present systems, in an attempt to cut down the storage space requirements per replica, utilize strip film on rolls or in relatively shorter sections, rather than card mounted segments. In these systems procedures such as replacement of a particular replica with a replica bearing an undated version of the document image or such as reorientation of the physical order of replicas, become time consuming and costly since each replica is associated on a strip with many other replicas and therefore removal of one particular replica necessitates splicing to retain those replicas not being changed. Moreover, even then splicing is not practical in some instances where changes in replicas and physical orientation are required quite frequently. In other instances the ancillary splicing equipment is not available, and it then becomes necessary to create new strips of film as the need arises.

The above instances are merely exemplary of the problems encountered in the information storage and retrieval art in attempts to provide means for storing information bearing media in a manner whereby there is minimum space requirements but still simple access to a particular document replica. The need for simple access is most prevalent in systems adapted to accommodate replicas of documents constantly requiring updating, such as bookkeeping records, schedules of transportation departures and arrivals, schedules of tariffs or the like, customer information listings, etc.

It should be noted that, although document replicas of the microfilm type are referred to throughout, all equivalent or similar image bearing media are capable of being handled in a like manner and are within the scope of the present invention to the extent that the unique combination described hereinafter is not limited to any particular type of image bearing media.

It is, therefore, an object of the present invention to provide a novel holding device.

Another object is to provide an economical holding device for document replicas or the like that is durable and adapted to protect the document replicas from damage during frequent manipulation.

Still another object is to provide a flexible holding device for a plurality of microfilm segments that is adapted to rigidly retain the segments in side by side relationship for ready access to each particular segment.

Yet another object is to provide a holding device for a plurality of document replicas, such as microfilm segments, in which each replica is individually accessible for removal or reorientation.

A further object is to provide a novel combination of a group of document replicas and a device for holding such document replicas in side by side relationship while permitting selective release of each individual replica without disturbing the remaining replicas.

A still further object is to provide a novel combination of a group of document replicas and a flexible holding device for rigidly retaining same for both storage and operative manipulation, which combination permits selective removal of the document replicas and/or reorientation of same without damage to such replicas.

The present invention is directed to a device for firmly holding a plurality of document replicas or any segmental image bearing media of the nature described above, in contiguous side by side relationship, and which device is further adapted to selectively release any particular replica. The device presented has a basic strip configuration with a stiffness characteristic such that it may be manipulated (manually or automatically) as a rigid strip in the manner of a panel, thus the overall device is referred to hereinafter as a panel. It is to be understood that the term "rigid" is used in a relative sense to depict the strip as a panel and that actually the panel has a certain degree of flexibility without which its proper function would be negated. According to a preferred embodiment, the panel is generally channel shaped and as such includes two integral holding portions disposed along longitudinal edges thereof for retaining a plurality of replicas therebetween, transversely of the panel. One of the holding portions is adapted to resiliently engage each of the replicas while the other of the holding portions in effect holds the replicas in a manner whereby they normally are not permitted to become disengaged from the holding portion resiliently engaged therewith. However, a feature of the panel is its novel configuration which permits the holding function to be eliminated. This is done by exposing one edge of any selected replica by manipulating the panel in a simple twisting motion adjacent the selected replica, for presenting the mentioned edge for manual removal from resilient engagement.

The panel further includes, disposed at both ends, stop means for preventing longitudinal shifting of the replicas. Thus, the panel retains the replicas in side by side relationship along a rigid strip and prevents removal of the replicas via the ends, accidentally or otherwise. In the event that it becomes necessary to remove a particular replica, then, by virtue of the flexibility of the panel and by proper manipulation of the novel arrangement, the replica can be removed directly from its location in a simple manner without affecting the positions of the remaining replicas. Replacement of the replica is accomplished in an equally simple manner. The removal and replacement procedures are described in detail hereinafter.

The foregoing and other objects, features and advantages of the invention will appear more fully hereinafter from a consideration of the detailed description which follows, in conjunction with the accompanying drawing wherein one embodiment of the invention is illustrated by way of example. It is to be expressly understood, however, that the drawing is for illustrative purposes only and is not to be construed as defining the limits of the invention.

In the drawing wherein like reference characters refer to like parts throughout the several views:

FIG. 1 is a partial plan view of subject device;

FIG. 2 shows a cross section taken along line 2—2 of FIG. 1 and a partial phantom outline to illustrate the degree of relative flexibility of subject device;

FIG. 3 is a partial longitudinal section taken along line 3—3 of FIG. 1;

FIG. 4 is an illustration further demonstrating the relative flexibility of subject device;

FIGS. 5 and 6 are diagrammatic illustrations in perspective of a portion of subject device during a typical replica removal manipulation thereof;

FIGS. 7 and 8 show a cross section of subject device during different stages of replacement manipulation of a document replica.

Referring to the drawing for a detailed description of the present invention, and more particularly to FIG. 1 wherein a plan view of one embodiment is shown, the reference numeral 10 generally designates a holding device which includes a panel 11 for holding a plurality of associated document replicas 12, each of which is referred to throughout by the same reference numeral, as explained below. Holding device 10 is shown cut away at its center to illustrate the strip length as being indeterminate. This length is not critical and may be established in accordance with any particular system demands, e.g., a system may have a strip storage area having dimensions which dictate a panel length limitation of twenty document replicas of a specific width.

Referring to FIGS. 2 and 3, along with FIG. 1, panel 11 comprises an elongated wall 13, the opposing longitudinal edges of which have extending therefrom first and second integral flange portions 14 and 15, respectively, which accommodate document replicas 12 in the manner illustrated in FIG. 2. The panel further comprises first and second end members 16 and 17, respectively, each of which includes an ear 20 adjacent to and extending between the ends of flanges 14 and 15. The bottom surface of ear 20 is secured to the upper surface portion of wall 13 extending beyond the ends of flanges 14 and 15 (see FIG. 3). The panel is adapted in the embodiment shown for automatic manipulation by virtue of the configuration of the end members, however, manual manipulation is not precluded. To this end, the end member 16 is provided with notches 21 for accommodating the jaws of a conventional automatic handling device (not shown), and end member 17 is provided with a slot 22 defined by resilient portions 23 of the end member 17, for receiving an appropriate vertical bar to longitudinally secure or transfer the panel 11. The configuration of end members 16 and 17 is merely exemplary of the many configurations which could readily be adapted to facilitate manipulation. For example, in a manual manipulation situation the end members could include opposed surface gripping portions or any other accommodating arrangement.

The document replicas 12 are referred to throughout by the same reference numeral for convenience, and for this reason the preferred embodiment shows a plurality of what appears to be identical replicas. The replicas 12 more specifically each includes an image bearing area designated 24 in the two left most replicas in FIG. 1 framed by a boundary area 25. As a practical matter each image bearing area 24 actually includes an image of different document. In the preferred embodiment each replica is a segment of microfilm, or a chip of microfilm as commonly referred to, and as such has a standard dimension which determines the width of panel 11. However, the generic term, document replica, is used in a broad sense and is not limited to chips and/or segments of microfilm. The document images could be presented in many other alternative forms without departing from the basic concept of the instant invention, e.g., chips could be mounted on a flexible transparent backing material, or a transparent protective coating could be applied to encase one or more chips. It should be stressed that, although document replicas are being considered in the preferred embodiment, the invention broadly encompasses all systems of the nature requiring means for holding any similar information bearing media in a side by side manner.

As indicated above, panel 11 is provided with first and second flange portions 14 and 15 to form a channel to accommodate replicas 12. The panel itself is fabricated from a clear, flexible, plastic material. In one tested device the channel shaped panel was successfully extruded from a clear polycarbonate resin, which was found to provide relative rigidity for manipulation while still exhibiting flexibility of the nature required. The tested device was found to resist wearing and warping, to have low water absorption characteristics, was found to be strong and durable, and it did not degrade an optical image projected therethrough.

Referring again to FIG. 2, flange 14 is shown in section wherein it is directed inwardly from the edge of wall 13 in a direction substantially parallel thereto, to form a bight 26. The edge portion of flange 14 is directed slightly outwardly from wall 13 to provide a receiving slot defined by the peripheral portion of the flange edge and the adjacent wall portion, which slot opening is slightly less than the thickness dimension of the associated replicas. In this manner the flange 14, which is resilient by virtue of the flexibility noted above, serves as a clip for embracing one longitudinal edge portion of each document replica by flexibly engaging such portion and urging it against wall 13 (also see FIG. 3).

Still referring to FIG. 2, flange 15 is shown in section wherein it is directed only slightly inwardly from the edge of wall 13 in a direction substantially perpendicular to the wall, to form a bight 27. Flange 15 (also inherently resilient) is disposed in the manner shown for a purpose to be made clear hereinafter in the operative description of subject device.

Referring now to FIG. 3, the stop means comprising ear 20, as discussed above, is shown as having a thickness equal to that of the document replicas 12. Therefore, when a plurality of document replicas are retained between flanges 14 and 15 (as shown in FIGS. 1 and 2) in side by side relationship, ears 20 disposed as described prevent longitudinal shifting thereof. In the event that, for some reason, document replicas are not made available or if they are not necessary in an amount that will fill the panel, then blank inserts may be provided as needed to assure a snug side by side, longitudinally-stable, relationship of the document replicas used.

An important feature of the above described combination is the novel configuration of the panel which enables the panel either to be manipulated in a conventional manner as required in retrieval, viewing and/or storing systems without dislodging the document replicas, or to be manipulated in the manner discussed below to permit ready access to any particular replica. The panel is rigid enough to substantially resist extreme bending due to its own weight when held at one end with the opposite end projecting outwardly in a longitudinal manner with respect to the earth's surface. Therefore, with the illustrated degree of rigidity, it is obvious that manual and automatic handling of the devices is greatly enhanced. On the other hand the panel is not so rigid that it may not be conveniently flexed if the need arises during a normal conveying operation. For example, referring to the illustration in FIG. 4, a flexed panel section 11 is shown disposed whereby one end 30 is twisted approximately 180° relative to the other end 31 without causing dislodgement of the document replicas 12. Thus, if during automatic manipulation it is necessary to turn the panel to expose the reverse side thereof, it can be readily accomplished. Likewise, other gentle bending and twisting operations may be performed without dislodgement of the replicas.

FIGS. 5 and 6 illustrate the preferred method in which a removal operation is carried out manually by manipulation of the above-described panel. For example, if it becomes necessary to remove a particular document replica 12', an operator first grasps the two adjacent replicas 12" between his thumbs 32, 33 and forefingers 34, 35 of his left and right hands, respectively, with the panel arranged with flange 15 toward the operator as shown in FIG. 5. The operator then merely maintains his right hand in a firm position and exerts a downward twisting force with his left hand, which force tends to abruptly bend the portion of flange 15 adjacent replica 12' down and back to temporarily take on the configuration illustrated by the phantom outline 15' in FIG. 2. By virtue of the inherent stiffness of replica 12' it tends to remain in its flat configuration. In this manner one longitudinal edge of replica 12' becomes exposed, as shown in FIG. 6, and may be released from the resilient holding action of flange 14 by merely grasping and pulling the exposed replica in a direction away from the flange 14.

Now referring to FIG. 7, when replacement of a removed or substituted replica into a vacant position in the panel is desired, the replica 12''' is first positioned as shown with one edge 36 adjacent the slot formed by flange 14 and wall 13 and with the other edge portion 37 resting on the edge of flange 15. By exerting a force in the direction of arrow P₁, replica 12''' is inserted under resilient flange 14 to the position shown in FIG. 8, with the peripheral area of edge portion 37 supported by flange 15. A force then exerted in the direction of arrow P₂ bends replica 12''' a sufficient amount to urge edge portion 37 past the edge of flange 15 to finally become seated between flanges 14 and 15 in the position shown in FIG. 2.

The above described unique device has many advantages and features in addition to those set forth in or obvious from the foregoing. For example, the device lends itself for use with replicas of varying shapes and sizes with one common dimension, or for use with replicas of various types with the same overall dimensions, such as unitary microfilm chips intermixed with microfilm chips of a lesser size mounted on appropriate means as described above. Prevalent throughout all of the uses is the advantage of ready and simple access to any particular chip or replica. This can be through a manual method as described above or through conventional automated method employed to perform the same steps.

The subject device also lends itself to convenient coding for use in automatic retrieval systems. The end portion of each panel and/or each specific location on the panel or adjacent flange portion can be coded with address and compatibility signals, or if desired the documents themselves can be coded on their margins with identifying indicia. To further facilitate the physical disposition of the replicas with respect to the panel, the panel can be marked at required intervals to define convenient boundaries. Further, the transparency of the panel which permits projection of the document image therethrough will also permit projection of the various coding and/or indicia.

Although a specific embodiment of the invention has been illustrated and described in detail by way of example, it is to be understood that the invention is not limited thereto. Various changes may be made in the design and arrangement of parts without departing from the spirit and scope of the invention as defined by the appended claims as will now be understood by those skilled in the art.

What is claimed is:

1. A holder for mounting a plurality of substantially rectangular document replicas in side by side relationship, comprising:
   (a) a flexible strip portion of transparent plastic material;
   (b) first and second resilient flange portions;
   (c) said first flange portion extending from one edge of said strip to form a first bight at said edge and inwardly directed therefrom substantially parallel and to overlie said strip, and further including a surface area projecting toward said strip to a distance less than the thickness of said rectangular document replicas for engaging the replicas, and an edge portion extending outwardly from said strip for receiving one of a pair of parallel edge portions of said replicas at an angle with respect to said strip portion;
   (d) said second flange portion extending from the other edge of said strip to form a second bight at said other edge at a distance substantially equal to the dimension of the replicas between said pair of opposing parallel edge portions, said second flange extending upwardly substantially perpendicular to said strip for flexibly engaging a second parallel edge portion of said replicas opposite said one parallel edge when said one parallel edge portion is contiguous with said first bight; and
   (e) stop means attached to said strip portion at the ends thereof to prevent longitudinal movement of said plurality of substantially rectangular document replicas when the replicas are retained in side by side relationship between said first and second bights of said resilient flange portions.

2. A holding device of the class described, comprising in combination,
   (A) a plurality of miniature document replicas, each of which comprises a rectangular image bearing segment having a common width dimension, and
   (B) a holder for mounting said replicas in side-by-side relationship, said holder comprising,
      (a) a transparent elongated flexible strip having first and second parallel edges and top and bottom planar surfaces, said strip width being substantially equal to said common width dimension,
      (b) a first integral flange extending from said first edge and including a reverse bent portion overlying said top surface to form a recess for receiving one common edge portion of said replicas, and (c) a second integral flange extending upwardly from said second edge and slanting inwardly to bear against the replica edges opposite to said one edge portions, (d) whereby said second flange is adapted to flex outwardly and downwardly to selectively release one of said replicas by disengaging the bearing portion from the opposite edge of said selected replica under conditions where said holder is twisted adjacent said selected replica.

3. A holding device comprising the combination set forth in claim 2, wherein said miniature document replicas comprise microfilm chips having like dimensions.

4. A holding device comprising the combination set forth in claim 3, wherein said microfilm chips include a centered rectangular image bearing area and a surrounding frame area, said rectangular dimensions being proportional to and approximately 60% of said chip dimensions and said first flange width being approximately 20% of the width of said flexible strip, whereby said first flange does not overlay said image bearing area.

5. A holder as set forth in claim 1, wherein the distance of said second flange portion extension beyond said replicas, under conditions where said replicas are disposed between said bights, is a distance less than the thickness of said replicas, whereby disengagement is facilitated of said second parallel edge portion of said retained replicas for selectively releasing said replicas when said strip is flexed adjacent said second flange, and wherein said second flange portion resiliently returns to its original condition when said strip is released from the flexed condition.

References Cited
UNITED STATES PATENTS

| | | | |
|---|---|---|---|
| 1,929,468 | 10/1933 | Bales et al. | 40—16 |
| 2,271,530 | 2/1942 | Wick | 40—64 |
| 2,794,279 | 6/1957 | Slavsky et al. | 40—10 |
| 2,903,808 | 9/1959 | Anderson | 40—16 X |

EUGENE R. CAPOZIO, *Primary Examiner.*

W. J. CONTRERAS, *Assistant Examiner.*